UNITED STATES PATENT OFFICE 2,546,332

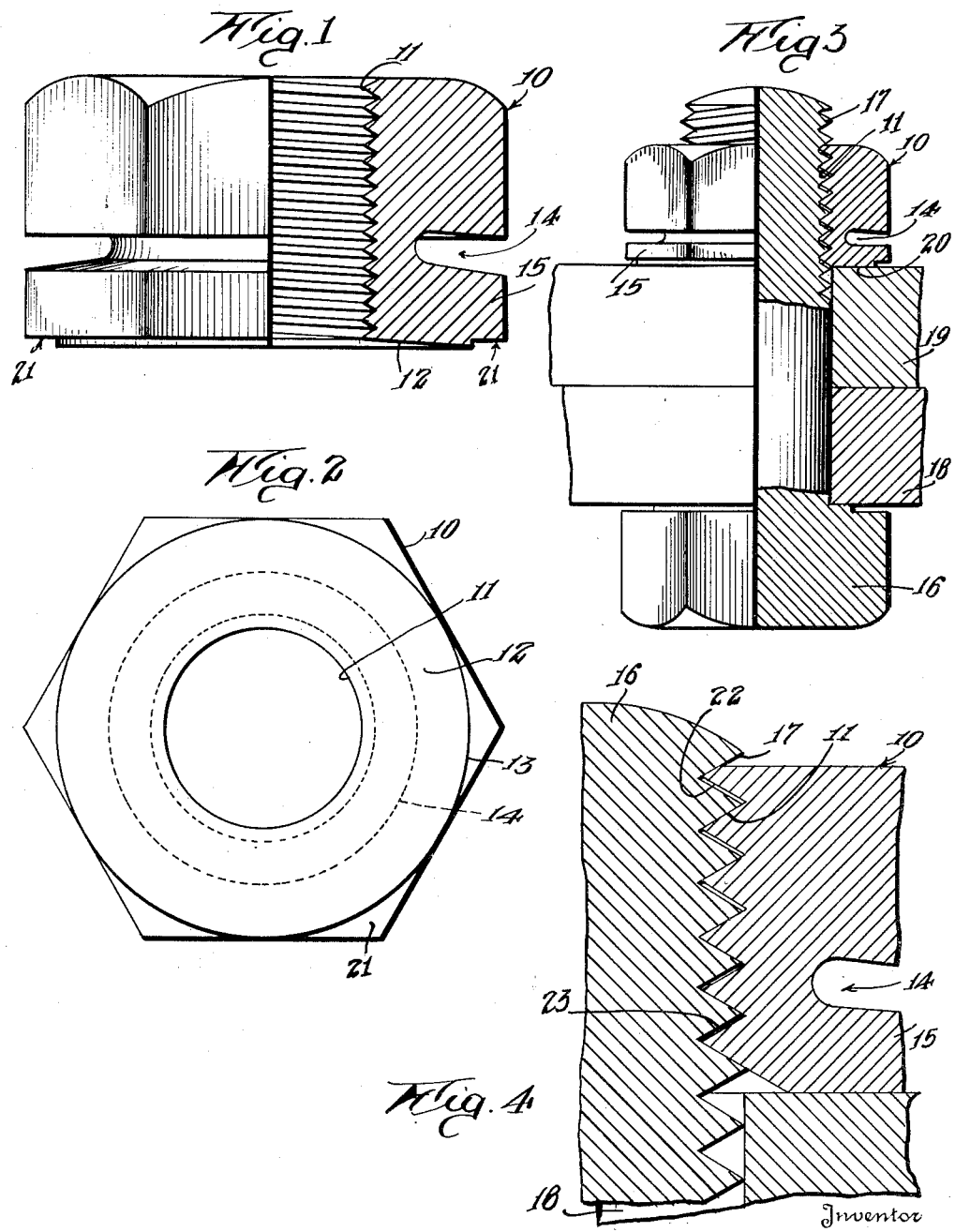

LOCK NUT

Francis G. Costello, Los Angeles, Calif.

Application October 30, 1946, Serial No. 706,573

2 Claims. (Cl. 151—21)

This invention relates to a self-locking nut and is particularly directed to a re-usable lock nut, which may be economically manufactured in large quantities.

The principal object of this invention is to provide a lock nut having a deformable lock flange for producing maximum locking effect without permanently distorting the nut.

Another object is to provide a lock nut of this type, which tightens automatically to induce maximum permissible stresses in the material of the nut below the elastic limit, and which resists further deflection.

A related object is to provide a lock nut which may be threaded into engaging contact and which is formed so that an abrupt stop is produced which resists further turning motion. The need for a torque wrench in installing such a lock nut is thereby eliminated.

Another object is to provide a lock nut of this type, which is provided with a weakening groove peripherally thereof and which, during its manufacture is subjected to an endwise compressive load to distort the threads in the vicinity of the groove.

Other objects and advantages will appear hereinafter.

In the drawings:

Figure 1 is an elevation, partly in section, showing a self-locking nut embodying my invention;

Figure 2 is a bottom plan view of Figure 1;

Figure 3 is an elevation, partly in section, showing a self-locking nut embodying my invention in operative position on a cooperating bolt; and Figure 4 is enlarged sectional elevation of a portion of Figure 3, showing details of engagement of the threads on the nut and the bolt when the nut is in locking position.

Referring to the drawings, the nut generally designated 10 is provided with an axial thread 11 which may be of any preferred form, but is preferably of the type known in the art as the American National form of thread. The nut is preferably hexagonal in outline, as shown in Figure 2. A work-engaging face 12 is formed at one end of the nut and this face is canted at a relatively small angle from a plane normal to the axis of the nut. This work-engaging surface 12 takes the form of a substantially frustro-conical surface, which extends from the threaded bore 11 to the circle 13 inscribed within the hexagonal outline of the nut. A weakening groove 14 encircles the nut near the end having the work-engaging surface 12 and cooperates with the surface 12 to define a locking flange 15. The angle of cant of the work-engaging surface 12 is maintained small enough to permit the surface 12 to develop into co-planar relationship with a radial abutment, without stressing the material of the nut beyond its elastic limit. If the elastic limit were exceeded, the locking flange 15 would be distorted beyond its ability to return to its initial position and this permanent set would impair the subsequent use of the nut, after removal from a cooperating bolt. As shown in Figure 3, a bolt 16, of any preferred type, having threads 17 of the same type as the threads 11 employed within the nut 10, extends through a pair of plates or other members 18 and 19. The outer surface of the member 19 provides an abutment 20 against which the work-engaging surface 12 of the nut 10 is adapted to seat. Upon threading the nut 10 onto the bolt 16, the outer portion of the surface 12, adjacent the circle 13, first contacts the abutment 20. Continued relative turning motion between the nut 10 and the bolt 16 serves to distort the lock flange 15 and progressively engage circular increments of the working surface 12 with the abutment 20. When the entire area of the working surface 12 is in co-planar relationship with the abutment 20, the effort required to produce relative motion between the nut and bolt suddenly increases. In effect, this amounts to the provision of a positive stop, which limits the extent to which the nut shall be tightened upon the bolt. The angle of cant of the working surface 12 is selected to produce a maximum amount of stress within the nut below the elastic limit of material. The position and proportions of the groove 14 also contribute to produce the desired effect.

As shown in Figure 4, the deformation of the lock flange 15 serves to separate the threads 11 in the upper portion of the nut from the threads within the lock flange 15. The result is that a frictional locking engagement is produced between the threads 17 of the bolt and the threads 11 within the locking flange 15. A careful inspection of Figure 4 will show that clearance 22 develops on one side of the thread flanks at one end of the nut and clearance 23 develops on opposite flanks of the threads at the other end of the nut, which has since matured into U. S. Patent No. 2,495,409, granted January 24, 1950. This self-locking nut, embodying my invention, has been found particularly useful for providing a reliable lock nut for close-fitting parts such as, for example, that set out as a class 3 fit, described in the handbook entitled "Screw Thread Standards for Federal Services, Handbook H28, National Bureau of Standards."

The maximum permissible clearance between adjacent flanks of the threads on the nut and the bolt is on the order of 0.006 inch for a one-half inch NF thread, class 3 fit, and this clearance may be reduced to zero if the bolt threads are on the high side of their tolerance and the nut threads are on the low side. For a steel nut having this particular thread and class of fit, it has been found that an angle of cant of 6° for the work-engaging surface is most satisfactory although angles from 4° to 8° may be used. No permanent set develops, and the self-locking nuts may be used again and again.

The large area of contact which develops between the work-engaging surface 12 and the abutment 20 is effective to produce a friction lock against relative rotation between the nut and the abutment. The large area reduces the unit stress on the abutment surface so that the latter remains undamaged by repeated installations of the nut. No gouging or galling of the abutment occurs, and therefore, the possibility of developing looseness at this contact area is substantially eliminated. A relief 21 is provided adjacent each corner of the nut outside the circle 13, so that the corners do not produce dangerously high unit stresses in the surface of the abutment when abutment and surface 12 are engaged under load.

The sides of the groove 14 may be formed in parallel planes normal to the axis of the nut, if desired, but it may be preferable to slant one side to converge inwardly at a slight angle, in order that a cutting tool may have easy entrance and egress. Furthermore, I have found that the groove 14 may be entirely omitted for bolt sizes under about ¼" diameter, without material sacrifice of the beneficial aspects of my invention.

For some applications, it is desirable to form the threads of the nut so that a "drag" will be encountered when threading the nut onto a bolt. I have found that this object may be readily and inexpensively accomplished by subjecting the otherwise completed nut to a heavy endwise force, such as, for example, may be attained in a punch press. The axial blow delivered by the punch press compresses the weakened section of the nut within the groove 14 beyond its elastic limit and the resultant permanent set compresses and slightly shortens the lead of the threads adjacent the groove. The angle between sides of the thread is slightly reduced by this process. It has been found that a cadmium-plated nut may, by this process, be converted to a satisfactory drag-type nut, and the cadmium or other plating does not come off when the nut is installed on a bolt.

This application is a continuation, in part, of my copending application, Serial No. 575,549, filed January 19, 1945, for "Lock Nut," which has since matured into U. S. Patent No. 2,495,409, granted January 24, 1950.

Having fully described my invention, it is to be understood that I do not wish to be limited to the details herein set forth, but my invention is of the full scope of the appended claims.

I claim:

1. A metallic self-locking nut having a body portion formed with an axial thread, a work-engaging face at one end of the nut canted inwardly at a relatively small angle to define a substantially frustro-conical shaped surface coaxial with the thread, an external weakening groove in the body of the nut within the half-length thereof adjacent the work-engaging face and forming a lock flange, the threads within the lock flange being deformed away from the remaining threads of the nut to frictionally grip cooperating threads on a bolt, upon turning the nut relative to a cooperating bolt sufficiently to flatten the frustro-conical work-engaging surface into surface contact with a radial abutment, the meeting of the work-engaging surface in surface contact with the radial abutment serving to provide a positive stop to limit turning movement of the nut, the proportions of the parts and the initial angle of cant being such that the elastic limit of the metal of the nut is not exceeded in so flattening the work-engaging surface.

2. A metallic self-locking nut of polygonal outline having a body portion formed with an axial thread, a work-engaging face at one end of the nut canted inwardly at an angle of from 4° to 8° to define a substantially frustro-conical shaped surface, the inner boundary of said surface being formed by the thread and the outer boundary being formed by a circle inscribed within the polygonal outline, an external weakening groove in the body of the nut within half-length thereof adjacent the work-engaging face forming a lock flange, the threads within the lock flange being deformed away from the remaining threads of the nut to frictionally grip cooperating threads on a bolt, upon turning the nut relative to a cooperating bolt sufficiently to flatten the frustro-conical work-engaging surface into surface contact with a radial abutment, the meeting of the work-engaging surface in surface contact with the radial abutment serving to provide a positive stop to limit turning movement of the nut, the proportions of the parts and the initial angle of cant being such that the elastic limit of the metal of the nut is not exceeded in so flattening the work-engaging surface.

FRANCIS G. COSTELLO.

REFERENCES CITED

The following references are of record in the file of this patent:

UNITED STATES PATENTS

| Number | Name | Date |
|---|---|---|
| 1,406,065 | Norwood | Feb. 7, 1922 |
| 1,734,445 | Place | Nov. 5, 1929 |
| 1,838,605 | Youlten | Dec. 29, 1931 |
| 1,885,459 | McDonnell | Nov. 1, 1932 |
| 2,003,591 | Hayden | June 4, 1935 |
| 2,286,895 | Carlson | June 16, 1942 |
| 2,320,030 | Danforth | May 25, 1943 |

FOREIGN PATENTS

| Number | Country | Date |
|---|---|---|
| 238,565 | Switzerland | Nov. 1, 1945 |
| 375,430 | Great Britain | June 30, 1932 |